United States Patent
Henry et al.

(10) Patent No.: US 7,913,913 B2
(45) Date of Patent: Mar. 29, 2011

(54) SELECTIVELY ILLUMINATING MARKING APPARATUS AND METHOD FOR ITS USE

(75) Inventors: Robert Henry, Bethlehem, PA (US); James Allen, Nazareth, PA (US); Eric Shuler, Easton, PA (US); Stephen Weiss, Easton, PA (US)

(73) Assignee: Crayola LLC, Easton, PA (US)

( * ) Notice: Subject to any disclaimer, the term of this patent is extended or adjusted under 35 U.S.C. 154(b) by 755 days.

(21) Appl. No.: 11/867,451

(22) Filed: Oct. 4, 2007

(65) Prior Publication Data

US 2008/0185441 A1   Aug. 7, 2008

Related U.S. Application Data

(60) Provisional application No. 60/849,395, filed on Oct. 4, 2006.

(51) Int. Cl.
*G06K 7/10* (2006.01)

(52) U.S. Cl. .......................................................... 235/473

(58) Field of Classification Search ............. 235/462.42, 235/473

See application file for complete search history.

(56) References Cited

U.S. PATENT DOCUMENTS

| | | | | |
|---|---|---|---|---|
| 3,911,270 A | * | 10/1975 | Traub ....................... | 250/227.13 |
| 4,939,356 A | * | 7/1990 | Rando et al. ............... | 235/462.2 |
| 5,422,469 A | * | 6/1995 | Bard et al. ............... | 235/462.33 |
| 7,240,839 B2 | * | 7/2007 | Jung et al. ..................... | 235/454 |
| 7,386,333 B1 | * | 6/2008 | Birecki et al. ................ | 600/310 |

* cited by examiner

*Primary Examiner* — Seung Lee
(74) *Attorney, Agent, or Firm* — Shook, Hardy & Bacon LLP (57) ABSTRACT

A data receiving and illuminatable marking instrument and spaced emission source is disclosed. The marking instrument may be a full duplex marking apparatus that communicates with spaced emitters transmitting infrared electromagnetic energy encoded with unique data packets. The marking instrument illuminates a portion of the marking implement in response to the data received from the data transmitting device. A method for using the above invention likewise is disclosed.

20 Claims, 7 Drawing Sheets

SELECTIVELY ILLUMINATING MARKING APPARATUS AND METHOD FOR ITS USE

This application claims the benefit of U.S. Provisional Application No. 60/849,395 filed on Oct. 4, 2006, which is incorporated herein by reference.

TECHNICAL FIELD

The present invention relates generally to a marking apparatus, and more particularly, the present invention relates to a marking instrument that communicates with a remote data transmitting device and illuminates a portion of the marking implement in response to data received from the data transmitting device.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides an apparatus, generally indicated at 10, comprising a marking instrument 12 and a spaced emission source 19 having one or more emitters 21 for emitting infrared electromagnetic energy encoded with data packets A portion of the marking instrument illuminates in response to a transmission from an emitter 16 in a particular color in the visible spectrum.

The marking instrument 12 preferably comprises a pen-like, cylindrical housing 14, an array of fiber optic bristles 16 extending generally longitudinally outwardly from the housing, a programmable controller 17, and one or more RGBY (Red, Green, Blue, Yellow) LED(s) 18. A sensor 15, such as a silicon photodetector, is mounted at an axial end of the housing of the marking instrument adjacent at least a first portion of the array of fiber optic bristles 16 to receive the infrared electromagnetic energy emitted by the emitters 21. The position of the photodetector 15 may be shifted to suit the design of the instrument. In response to receiving the infrared electromagnetic energy and processing the modulated data packets from a spaced emitter 21, the controller of the marking instrument illuminates the RGBY LED 18. This visible electromagnetic energy is conveyed via a second portion of the array of fiber optic bristles, which illuminates the second array of bristles in the particular color of the visible light as instructed via the data packet.

Figures 1, 2:
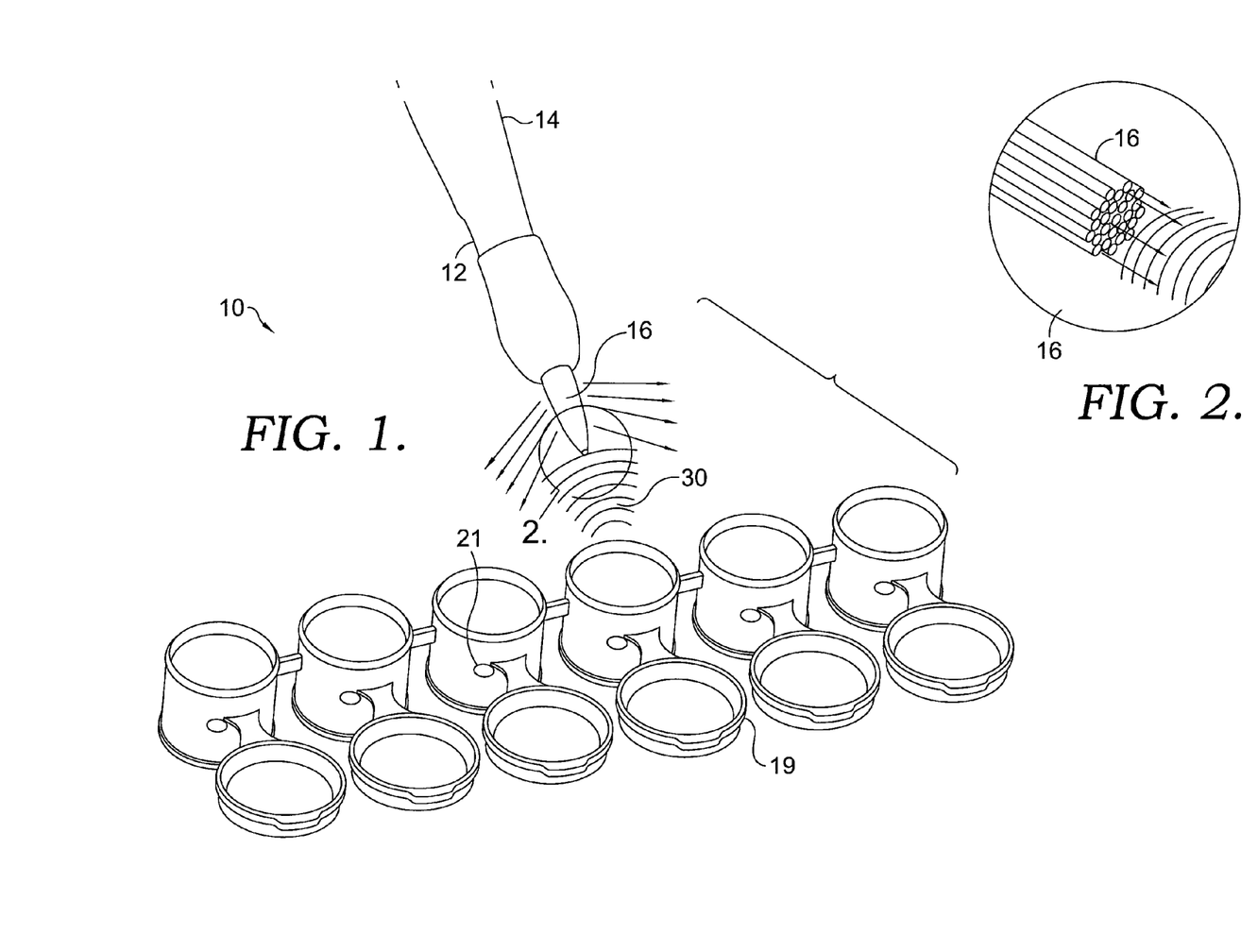
FIG. 1 is a schematic diagram of the system for use in implementing the present invention showing a full duplex mode of operation.
FIG. 2 is a close up of the array of fiber optic bristles in a full duplex marking instrument.

Each bristle 16 of the marking instrument is a fiber optic line or strand that conveys light photons from one end of the line to an opposite end of the line. In this description, the distal end shall have its ordinary meaning as the end farthest from the body of the marking instrument while the proximal end shall have its ordinary meaning as the end closest to the marking instrument. The array of bristles may be made from Nylon, Poly Propylene (PP), Polymethyl Methacrylate (PMMA), or Polycarbonate (PC). Further, as shown in FIGS. 2 and 4, each array may be densely packed together such that the distal ends of the array of bristles form a nearly continuous surface of photon conduits.

Figures 3, 4, 5:
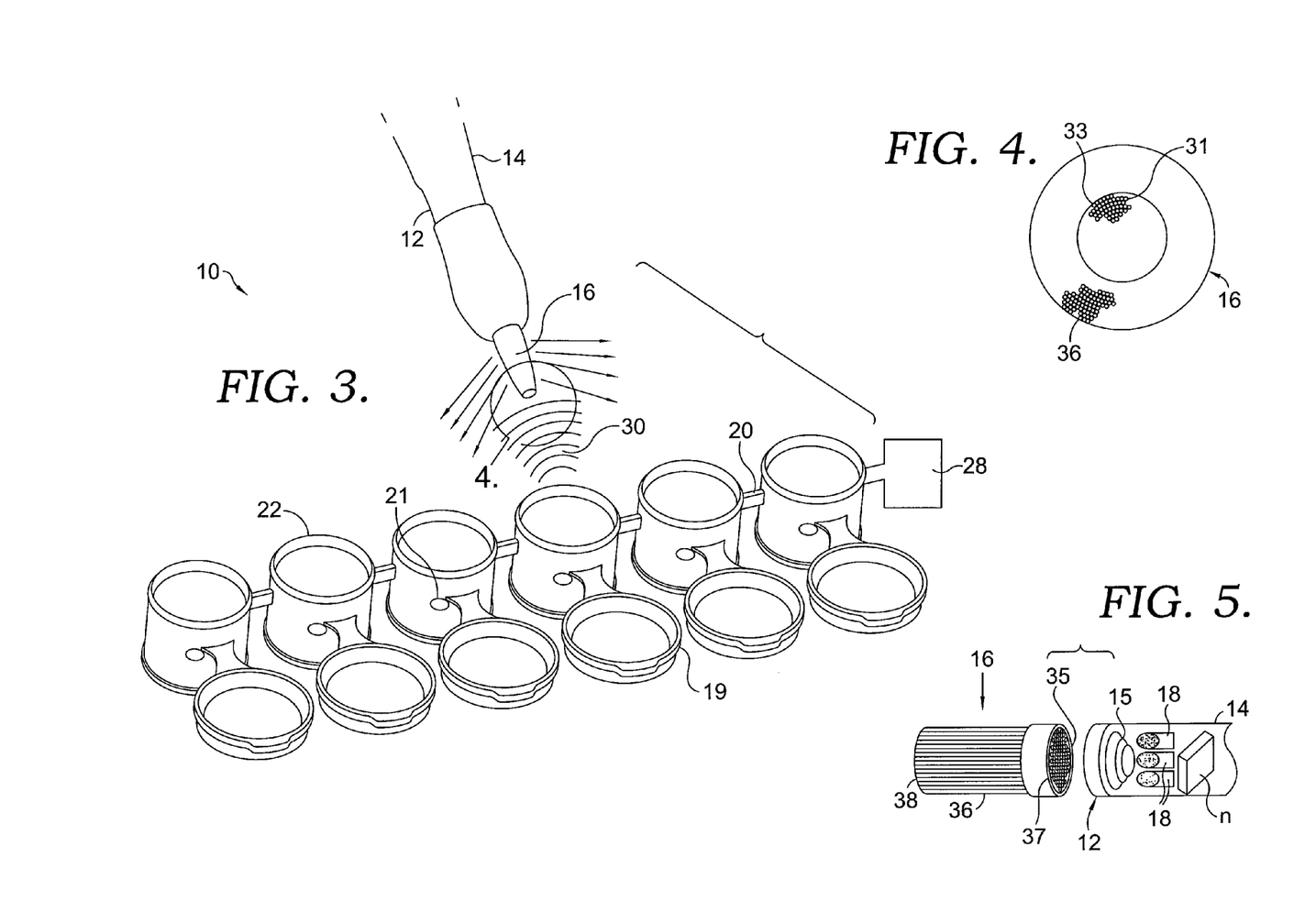
FIG. 3 is a schematic diagram of another embodiment of the marking apparatus for use in implementing the present invention.
FIG. 4 is an end view of the fiber optic bristles in the marking apparatus of the present invention showing the first and second array of bristles.
FIG. 5 is an exploded view of the marking instrument having a portion cut away for clarity.

In one embodiment shown in FIGS. 3 and 4, the marking instrument comprises a first array of bristles 31 preferably located centrally in the set of bristles 16 and generally coaxially with the longitudinal axis of the housing of the marking instrument. The first array of bristles 31 or first tuft is configured to receive at a distal end 33 of the bristles the infrared electromagnetic energy emitted from a particular emitter 21 of the spaced emitting source 19 and convey that energy to an opposite or proximal end 35 of the bristles, which projects the electromagnetic energy into the photodetector 15. Thus, an infrared photon exiting a particular area of the spaced emitter 21 enters the end of a bristle 33. The photon travels the length of the bristle to an opposite end 35 which is adjacent the photodetector. As the photon exits the opposite end of the bristle, the photon is received and detected by the photodetector.

In this embodiment, the marking instrument further comprises a second array of bristles or second tuft 36 that preferably is positioned outside of the centrally located first tuft of bristles 31. The second tuft 36 is likewise generally coaxially aligned with the longitudinal axis of the housing of the marking instrument. The second array of bristles 36 conveys visible electromagnetic energy that is produced by the LEDs 18 of the marking instrument in response to instructions received from the data packets 30 encoded on the infrared energy received from the spaced emitter. The visible electromagnetic energy is bused from the proximal end 37 of the second tuft of bristles to the distal end 38 of these bristles. It is to be understood that the first and second tufts of the array of bristles, 31 and 16, respectively, may be arranged such that the first tuft 31 is on the exterior of the marking instrument and the second tuft 36 is positioned on the interior, or the two sets of bristles may be interspersed, or located in any other pattern without departing from the scope of the present invention.

In an alternative embodiment, the first and second arrays of bristles 31, 36, respectively, are each configured to receive and transmit visible and infrared electromagnetic energy. In this embodiment, the visible electromagnetic energy and infrared electromagnetic energy are broadcast through the array of bristles in full duplex mode thereby allowing communication in both directions simultaneously.

The marking instrument 12 further includes a programmable controller 17, which may be one of a variety of clocked digital devices that contains registers, RAM, ROM, hardware peripherals and internal bus structures that processes machine code derived from a compiled piece of software written in a higher level, more abstract language which can be deployed to output the desired digital states at discrete points in time.

Alternatively or in addition, the controller may be a strictly clocked digital device built from logic blocks, discrete IC's and programmed via pin assertions. Alternatively or in addition, the controller may be a strictly digital device that is a field programmable gate array. Alternatively or in addition, the controller may be a mixed signal device (analog and digital integrated circuits on the same piece of silicon) that can output a unique waveform unlike a purely digital device would be able to achieve. Alternatively or in addition, the controller may be a circuit comprised of a combination of analog and digital discrete parts that can output a unique waveform unlike a purely digital device would be able to achieve.

Upon reception and confirmation of valid data via the controller 17, the controller outputs RGBY data to one of a variety of visible light emitting sources 18 mounted in the housing of the marking apparatus. The individual light emitting sources 18 (RGBY LEDs) of the marking instrument are controlled by variable current or variable pulse width to create the actual color (Red through Violet), which is bussed to one or both of the first and second array of bristles. The array of fiber optic bristles is arranged in a manner such that the second portion or the entire array of bristles buses the colored visible light from an RGBY (Red, Green, Blue, Yellow) LED or LEDs from the interior of the body of the marking apparatus to the distal ends of the array of bristles. As shown in FIG., the bussing of visible light and infrared light may be full duplex providing simultaneous transmission and reception in both directions.

In one exemplary embodiment of the present invention, the spaced emitting source 19 comprises a member 20 having a series of wells 22A-22F. Each well 22 preferably contains a colorless and substantially transparent marking composition (not shown), such as Color Wonder® paint, available from Crayola, as will be further described below. Each well is formed of a transmissive material and is substantially collinearly aligned with the other wells Further, well 22 may include a high output infrared emitter 21, such as an infrared electromagnetic energy emitting diode, mounted to a lower surface of the well such that it is located beneath the marking composition. For example, Waitrony Co. Limited, Part No. IE0505, is a suitable emitter.

Each emitter or diode 21 is controlled via a programmable controller 28 that addresses each infrared emitter and encodes an infrared data packet 30 into the infrared electromagnetic energy such that the data packet contains data for 256 color codes plus synchronization and error checking data used by the controller 17 of the marking instrument.

Each emitter 21 may be indexed singularly, or alternatively, the individual emitters may be addressed in plurality by the controller 28. The electromagnetic energy may be modulated by Pulse Position Modulation (PPM) in which M message bits are encoded by transmitting a single pulse in one of $2^M$ possible time-shifts. This is repeated every T seconds, such that the transmitted bit rate is M/T bits per second. The advantage of using PPM for the present invention is that the receiver is small and light-weight. Alternatively, the infrared electromagnetic energy may be modulated by On-Off Keying (OOK) by encoding digital data as the presence or absence of a carrier wave. Another alternative is to encode the digital information via Manchester Code or Phase Coding. This protocol encodes each data bit with at least one OOK transition. It is therefore self-clocking, which means that a clock can be recovered from the encoded data. Each bit occupies the same time. Yet another alternative is to encode the digital information through Phase Shift Keying (PSK), which encodes each data bit (1 or 0) with a unique phase duration.

Figure 6:
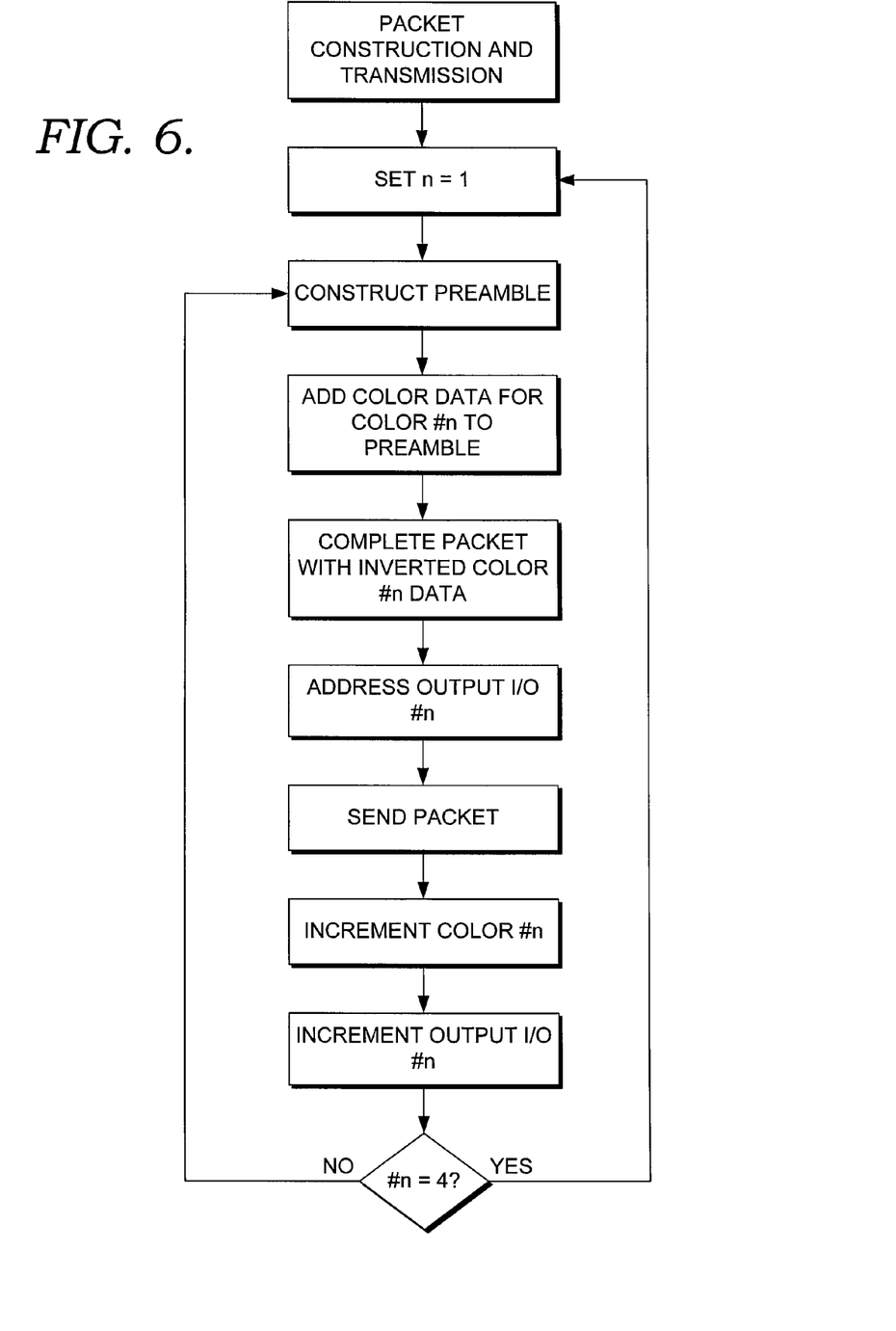
FIG. 6 is a flow diagram showing the data packet construction for infrared transmission of color data through a marking medium.
Figure 7:
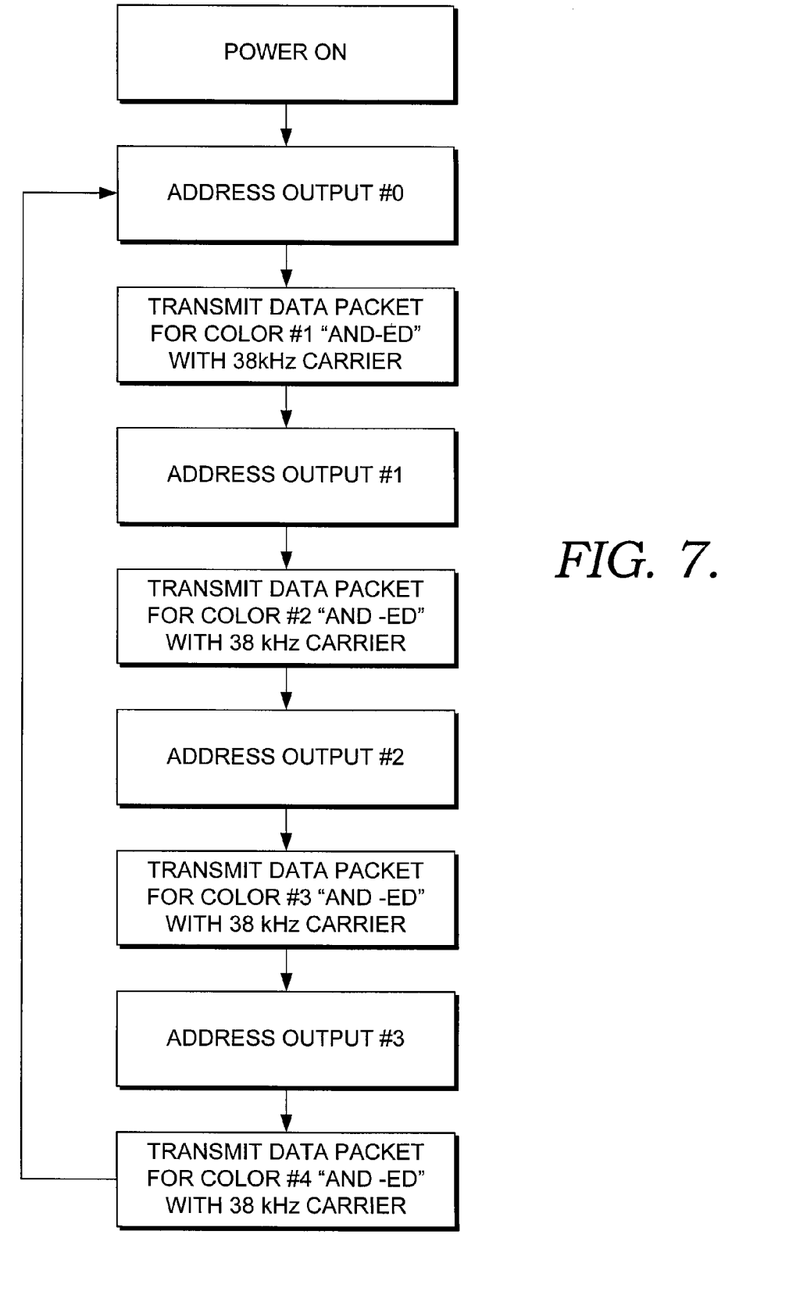
FIG. 7 is a flow diagram of the operation of infrared transmission in the present invention.
Figure 8:
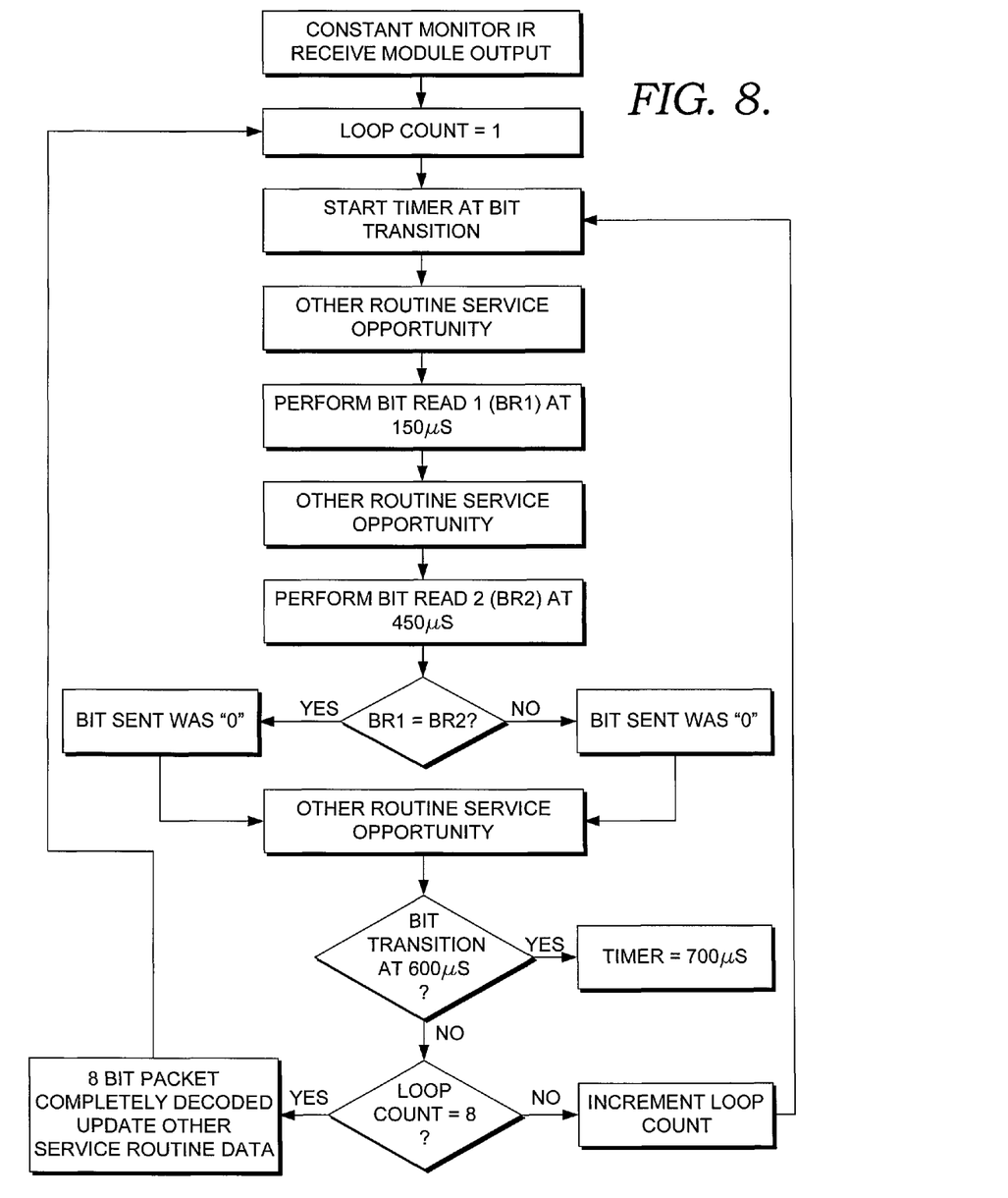
FIG. 8 is a flow diagram showing the data packet reception and decoding by the marking instrument.
Figure 9:
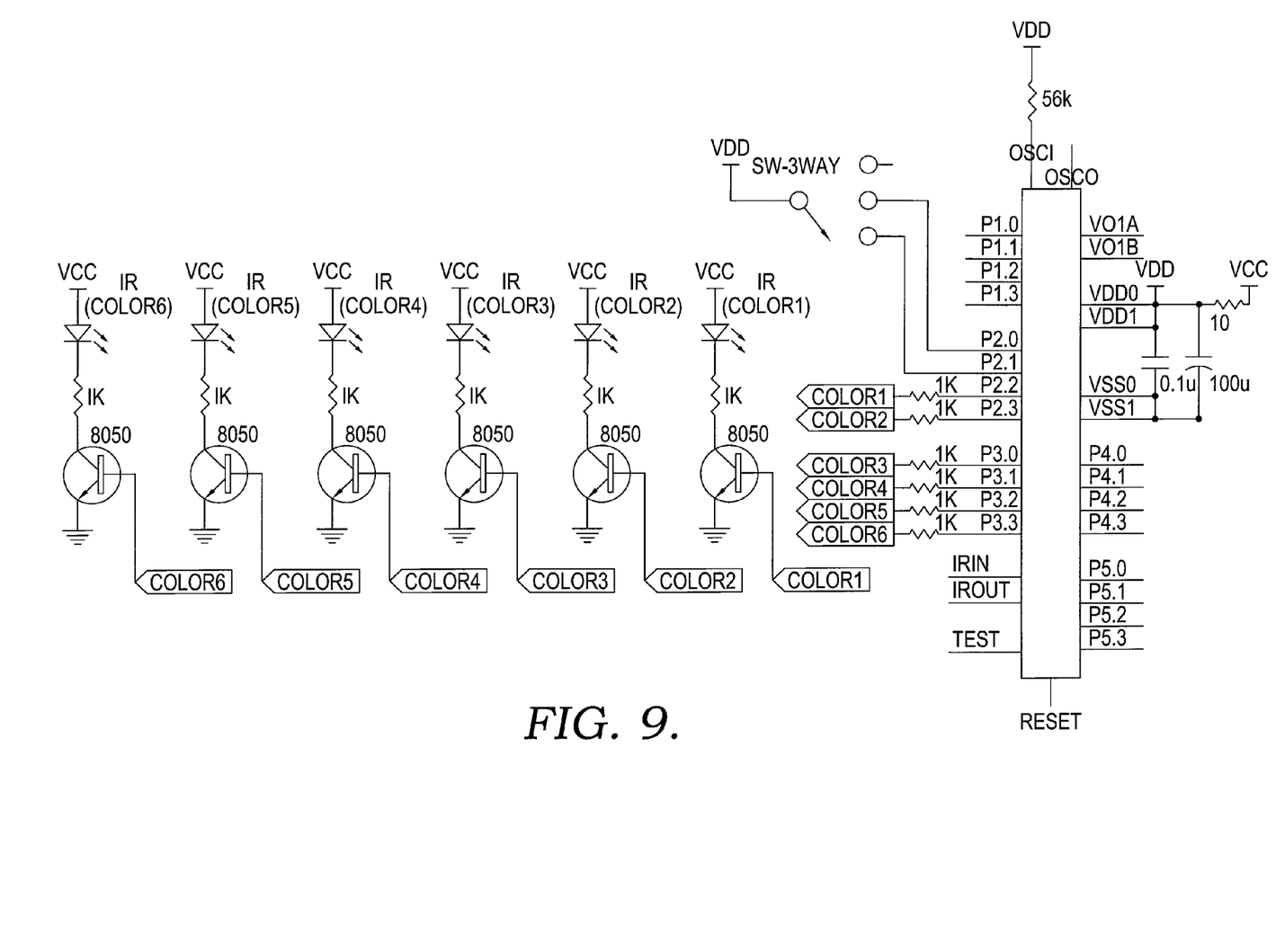
FIG. 9 is an exemplary schematic diagram for the infrared emitting source of the present invention.
Figure 10:
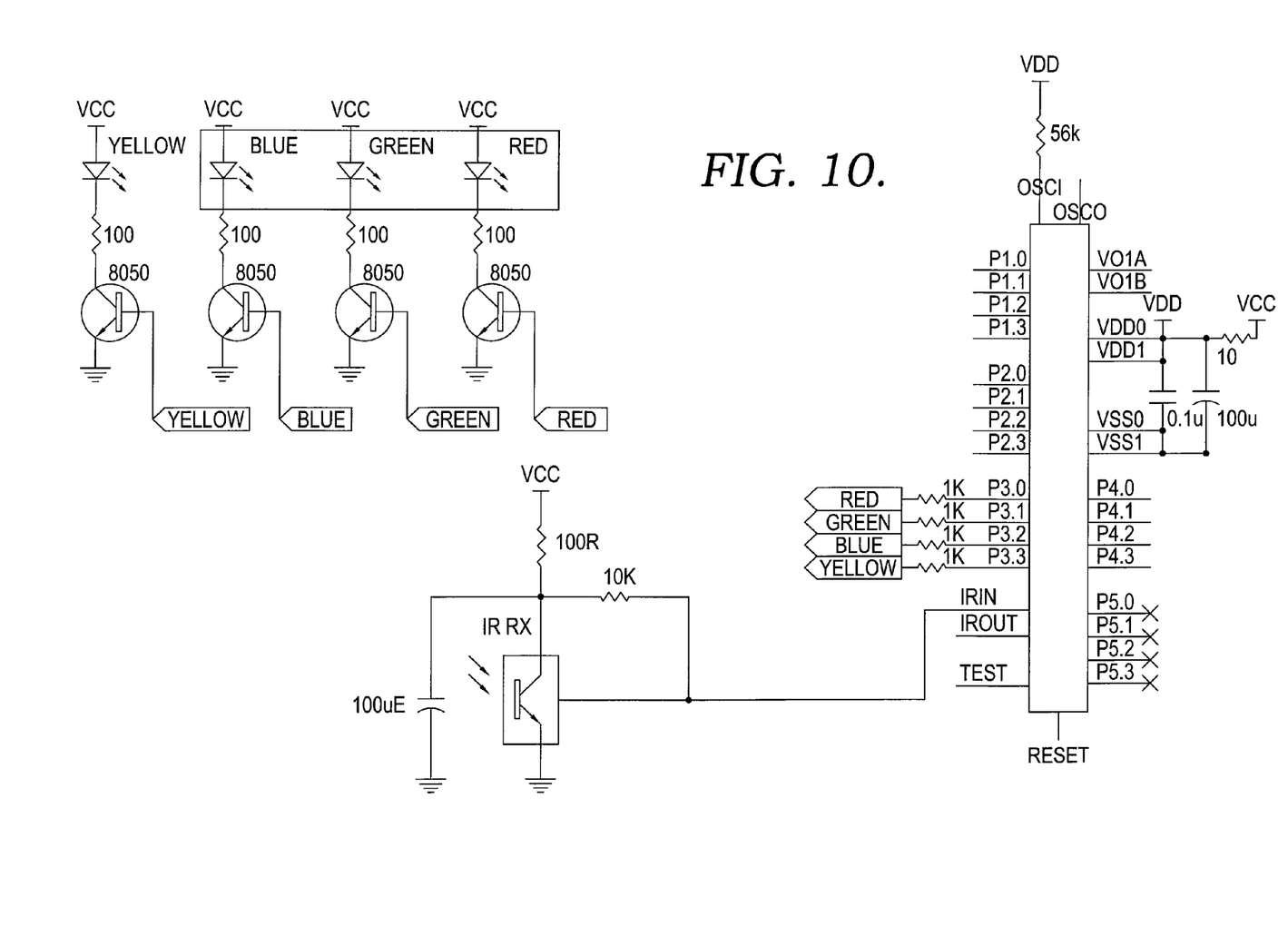
FIG. 10 is an exemplary schematic diagram for the RGBY visible light emitting diodes of the marking instrument of the present infrared.

FIG. 6 illustrates a data packet 30 construction for infrared transmission of color data through the marking composition. This exemplary embodiment uses a daisy chain construction. FIG. 7 illustrates a macroscopic operation of the infrared transmission. The data packet 30 construction for infrared transmission of color data through the marking composition and macroscopic operation of the infrared transmission is shown for four distinct colors. It is to be understood that the invention is not limited to this exemplary embodiment. FIG. 8 illustrates an exemplary embodiment of data reception and decoding. The term "other routine service opportunity" is defined as time slots between scheduled bit reads where other software routines for color mixing can be updated and processed.

The marking implement 12 and the spaced emitting source 14 may be battery or electrically powered. In a battery powered embodiment, the batteries for the marking instrument may be housed in housing 14 to provide a non-tethered portable apparatus, or, alternatively, may be housed in the underlying member 20. In the latter embodiment, the marking instrument is tethered to the underlying member and is in electrical communication therewith.

The marking composition contained in the substantially transparent wells 22 comprises at least one color precursor, particularly, a leuco dye intermediate. The leuco dye remains colorless until reacted with a color-triggering developer provided in a coating disposed on a substrate. The marking composition is applied by way of the marking instrument 14 to the specially coated substrate. In one preferred embodiment, the marking composition may be in the form of paint, and can therefore be applied by way of a brush. The color precursor comprises at least one leuco dye intermediate. The leuco dye intermediates are preferably present in a concentration of about 0.5% to about 6% by weight of the marking composition.

The leuco dye intermediate is desirably introduced into a liquid medium, which is used as a carrier or vehicle. Preferably, the color precursor is dissolved in solvent. The solvent (or combination of solvents) is desirably substantially optically clear and is selected such that the solubilized dye gives good color formation when reacted with the color-triggering developer. In addition, the solvent desirably has a viscosity of about 12 centipoises or less (and more preferably 10 centipoises or less), in order to be suitable for application in a capillary system, as is particularly desirable for the present invention. The solvents should be non-toxic and non-flammable (e.g., flash points above about 280.degree. F.) and, hence, should exhibit low volatility. In addition, the solvents should be substantially non-odorous.

The substrate coating comprises a color-triggering developer, which serves as a chemical activator or initiator for the conversion of the color precursor into chromophore containing dyes that display bold and vivid colors. When the color precursor is a leuco dye intermediate, the color-triggering developer is a Lewis acid. The most desirable Lewis acids for use as the color-triggering developer of the present invention are zinc containing resins. Most preferably, an especially desirable color-triggering developer is a zincated carboxylic resin that is dispersed in the coating. For example, the zinc acts as a Lewis acid and causes the rearrangement of the dye molecule, thereby resulting in the development of the desired chromophore. Particularly, the development of the color occurs when the color-triggering developer reacts with the leuco dye intermediate to form a highly conjugated compound thereby resulting in a chromophore of intense color.

The marking composition and suitable substrate are disclosed in greater detail in U.S. Pat. No. 6,124,377, the disclosure of which is fully incorporated herein by reference Upon applying power to the wells 22, the microcontroller 28 addresses an individual IR LED and transmits a unique data packet 30 into the marking medium. The microcontroller then repeats endlessly until the unit is de-powered. Once powered, the marking instrument continuously monitors the photodiode sensor 15 for a valid transmission of a well infrared data packet 30. Upon reception and confirmation of valid data via the microcontroller 17, the marking apparatus outputs RGBY data to one of a variety of visible light emitting sources 18. The individual light emitting sources (RGBY LEDs) are controlled by variable current or variable pulse width to create the actual color (Red through Violet), which is bussed to either the second array of fiber optic bristles 36 or the set of bristles 16 in full duplex mode. This illuminates the bristles of the marking instrument.

Color variations, specifically 256 color variations, are easily achievable with an 8 bit microcontroller. It is to be understood that in an alternative embodiment, each well may be lit separately by an individual light emitting source (RGBY LED), or alternatively, that a particular well may illuminate in response to the marking apparatus being in close proximity to the well, without departing from the scope of the present invention.

The system of the present invention is intended to be used by children as a learning tool or as a color selection tool, when using the above-described colorless paint technology. Preferably, the data packets 30 encoded for a particular emitter 21 correspond to the color of the colorless paint technology once applied to the substrate. Thus, for example, if the marking instrument 12 is brought in proximity to a particular well 22, the data packets of that well will be received by the first set of the array of bristles 31 and bussed to the photodetector 15 and processed by the controller 17. In response, as previously described, visible light in a particular color is emitted by the marking instrument LEDs 18. This visible light is bussed from the proximal end of either the second array of bristles of the entire set of bristles to the distal end, which illuminates the bristles of the marking instrument. Further, the visible light enters the colorless marking composition of the well 22, which likewise may appear to illuminate.

The present invention has been described in relation to a particular embodiment, which is intended in all respects to be illustrative rather than restrictive. Alternative embodiments will become apparent to those skilled in the art to which the present invention pertains without departing from its scope.

The invention claimed is:

1. A marking system, comprising:
   a marking instrument comprising a body, an array of fiber optic bristles mounted to the body, a receiver for receiving and decoding encoded infrared electromagnetic energy, and a transmitter for transmitting visible electromagnetic energy through at least a portion of the array of fiber optic bristles; and
   an emission source spaced from the marking instrument and operably configured to emit uniquely encoded infrared electromagnetic energy.

2. The system of claim 1 wherein the emission source comprises a member and more than one well, each well comprising a emitter capable of emitting uniquely encoded infrared electromagnetic energy.

3. The system of claim 2 wherein the wells are formed of a transmissive material and are substantially collinearly aligned with the emitters of the other of the more than one well.

4. The system of claim 3 wherein each well further comprises a colorless marking composition.

5. The system of claim 2 wherein the emission source comprises a programmable controller that addresses said emitters and encodes the infrared electromagnetic energy by Pulse Position Modulation.

6. The system of claim 2 wherein the emission source comprises a programmable controller that addresses said emitters and encodes the infrared electromagnetic energy by On-Off Keying.

7. The system of claim 2 wherein the emission source comprises a programmable controller that addresses said emitters and encodes the infrared electromagnetic energy by Phase Coding.

8. The system of claim 2 wherein the emitters are addressed singularly.

9. The system of claim 2 wherein the emitters are addressed in plurality.

10. The system of claim 2 wherein the receiver of the marking instrument is a programmable controller that receives said uniquely encoded infrared electromagnetic energy and decodes the encoded data packet.

11. The system of claim 1 wherein the emission source comprises a programmable controller that addresses said emitters and encodes the infrared electromagnetic energy in via Phase Shift Keying.

12. The system of claim 1 further comprising a power source and wherein the marking instrument is in electrical communication with the spaced emission source and the marking instrument and the emission source are powered by the power source.

13. The system of claim 1 wherein the marking instrument further comprises a power source and wherein the emission source further comprises an emission power source.

14. The system of claim 1 wherein the array of fiber optic bristles are made from one of Nylon, Poly Propylene, Polymethyl Methacrylate, and Polycarbonate.

15. The system of claim 1 wherein the array of fiber optic bristles comprises a first array of fiber optic bristles and a second array of fiber optic bristles, the first array are positions in the center of the array of fiber optic bristles as viewed from an end, the first array of fiber optic bristles being operable configured to receive the uniquely encoded infrared electromagnetic energy and convey that uniquely encoded infrared electromagnetic energy to the receiver.

16. The system of claim 15 wherein the array of fiber optic bristles further comprises a second array of fiber optic bristles, the second array being positioned concentrically around the first array and toward the exterior of the array of fiber optic bristles as viewed from an end.

17. The system of claim 16 wherein the second array of fiber optic bristles are operably configured to transmit visible electromagnetic energy.

18. The system of claim 1 wherein the array of fiber optic bristles are operably configured to transmit visible electromagnetic energy and infrared electromagnetic energy.

19. The system of claim 18 wherein the visible electromagnetic energy and infrared electromagnetic energy are transmitted in full duplex mode.

20. A method for communicating information to a user of a marking instrument, the method comprising the steps of:
   providing a marking implement comprising a body, a data reception and decoding device, an visible electromagnetic illumination device and at least one set of fiber optic bristles, and a spaced emission source comprising one or more emitters operably configured to transmit infrared electromagnetic energy encoded with unique data packets;

transmitting the infrared electromagnetic energy encoded with unique data packets from the emitters of the emission source;

moving the marking implement over one of the emitters of the spaced emission source;

receiving and decoding the infrared electromagnetic energy encoded with unique data packets; and illuminating at least a portion of the at least one set of bristles of the marking instrument in response to the decoded data packet.

\* \* \* \* \*